INVENTORS
OSCAR M. WICKEN
LEO L. GILL
BY
Brown, Critenden, Glick & Peckham
THEIR ATTORNEYS April 17, 1962     O. M. WICKEN ETAL     3,030,091
ROTARY KILN WITH HEAT EXCHANGER
Filed Jan. 5, 1960     3 Sheets-Sheet 3

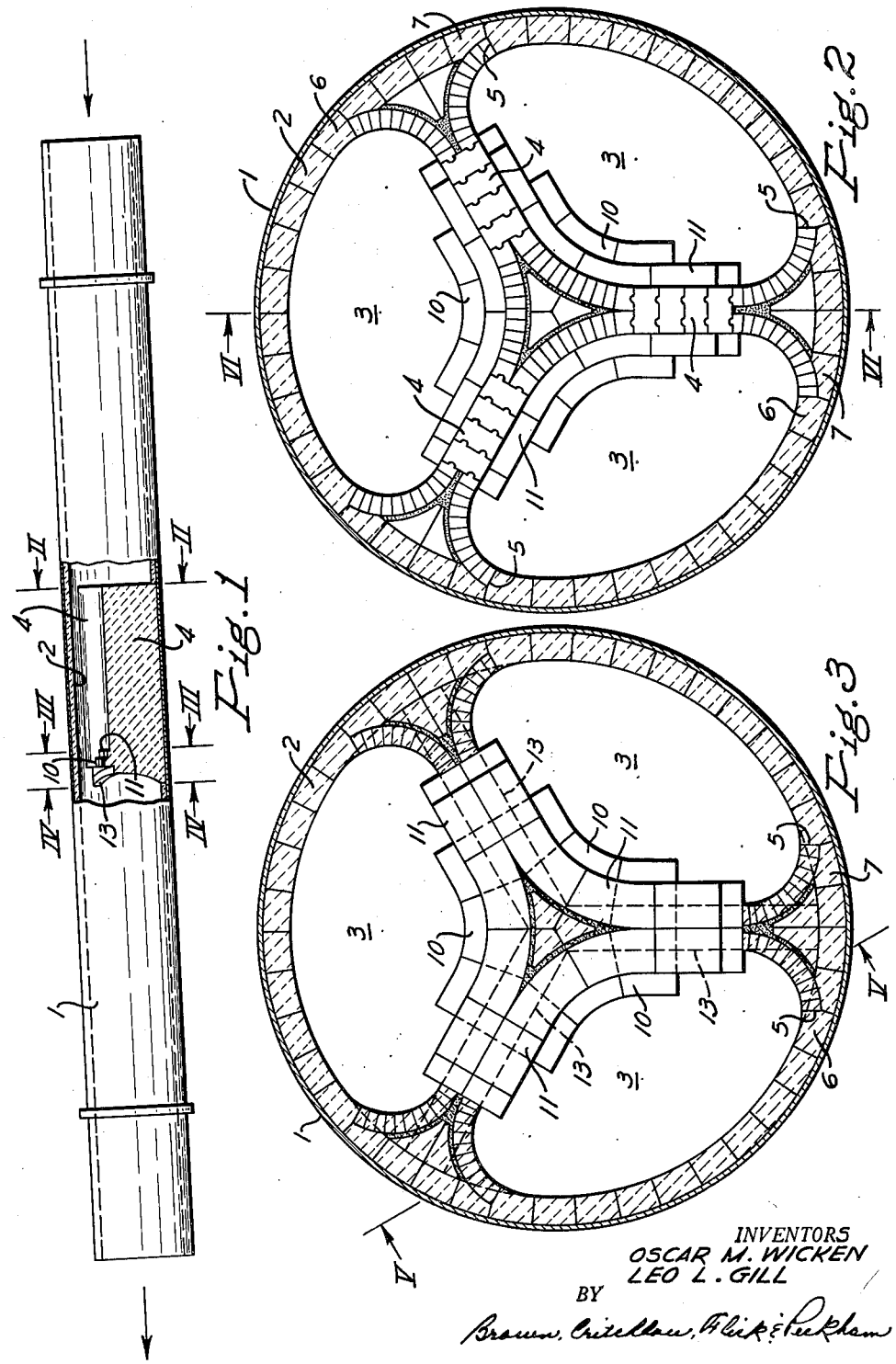

INVENTORS
OSCAR M. WICKEN
LEO L. GILL
BY
THEIR ATTORNEYS

United States Patent Office 3,030,091
Patented Apr. 17, 1962

3,030,091
ROTARY KILN WITH HEAT EXCHANGER
Oscar M. Wicken and Leo L. Gill, Pittsburgh, Pa., assignors to Harbison-Walker Refractories Company, Pittsburgh, Pa., a corporation of Pennsylvania
Filed Jan. 5, 1960, Ser. No. 664
2 Claims. (Cl. 263—32)

This invention relates to rotary kilns for drying or heat treating granular or powdered material and the like, and more particularly to inclined kilns containing heat exchanger sections.

It is not unusual to provide a rotary kiln with a central section that produces better exchange of heat between the countercurrently flowing combustion gases and the material being dried or heat treated. Such a section consists of a plurality of circumferentially spaced tunnels that divide the material into several parallel streams and thereby spread it out more thinly into contact with more heated wall area. However, there have been objections to such heat exchanger sections heretofore. When a kiln rotates, it tends to flex slightly out of round, but a rigid heat exchanger structure prevents such flexing, with the result that bricks in the walls of the tunnels may be crushed. Another objection is that the heat exchanger section usually is built completely inside the usual refractory lining of the kiln, whereby it is difficult to anchor the exchanger and it may rotate or slide in the kiln. A further disadvantage is that the courses of bricks that form the lower end of the inclined heat exchanger tend to peel away from the rest of the courses. Finally, the material passing through the particular tunnel that happens to be uppermost at any given time cascades out of its lower end. When that material is fine, some of it will be picked up by the draft up through the kiln and will be blown out of the upper end.

It is among the objects of this invention to provide a rotary kiln with a heat exchanger which has an improved shape, which permits the kiln to flex without crushing the bricks, which is securely locked into the lining of the kiln, in which the courses of bricks at the lower end of the exchanger cannot peel away, and in which material leaving the heat exchanger is prevented from sifting down across the stream of hot gases flowing up through the kiln.

In accordance with this invention, an inclined rotatable cylindrical metal shell has an upper end for receiving material to be heated, and a lower end for discharging the material. The inside of the shell is lined with a refractory. A portion of the kiln is provided with a cluster of three heat exchanger tunnels that are ovate in cross section and separated by three radial partition walls made of refractory material. The outer wall of each tunnel is formed by the lining of the kiln, with which the partition walls interlock. A dam extends across the inner wall of each tunnel at its discharge end to prevent sifting of material out of the tunnel when it is upperpost. Also, at the discharge end of the tunnels there are refractory buttresses extending from the junction of the partition walls outwardly along them to the kiln lining. These buttresses are inclined from that junction toward the discharge end of the kiln.

The preferred embodiment of the invention is illustrated in the accompanying drawings, in which FIG. 1 is a side view of a rotary kiln with the central portion broken away to show the heat exchanger in central longitudinal section;

FIGS. 2, 3 and 4 are transverse sections of the kiln taken on the lines II—II, III—III and IV—IV, respectively, of FIG. 1;

Figure 5:
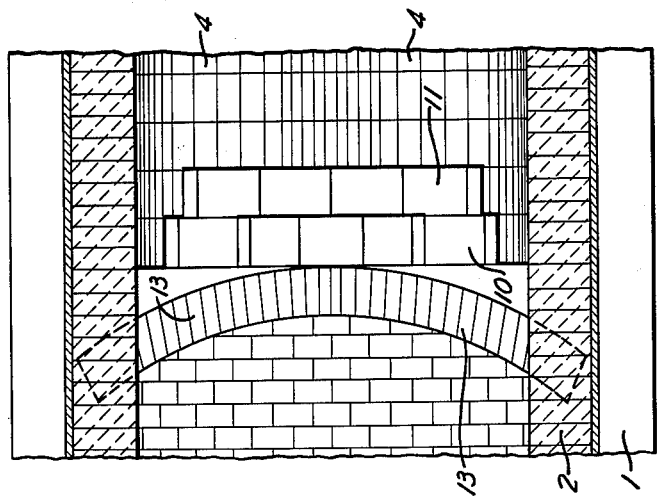
FIG. 5 is a fragmentary longitudinal section taken on the line V—V of FIG. 3.

Referring to FIG. 1 of the drawings, a rotary kiln is shown, which comprises a long tubular metal shell 1 that is inclined to some extent so that course or fine granular, powdered or other finely divided material fed to its upper end in conventional manner will flow down through the kiln as it rotates and be discharged from its lower end. The inside of the kiln has a lining 2 formed from refractory bricks. The support for the kiln and the means for rotating it are not shown, as they are well known to those skilled in this art and are not part of this invention. It is also known that hot combustion gases are delivered to the lower end of the kiln and that they flow up through it in countercurrent relation to the material flowing down through the kiln.

At or near the center of the kiln it is provided with a heat exchanger to effect more thorough heat exchange between the hot gases, the kiln and the material passing through it. The heat exchanger is in the form of a cluster of three tunnels 3 that have moderately curved outer and inner walls connected by more sharply curved inner walls so that the tunnels are ovate in cross section, as shown in FIG. 2. The tunnels are formed by three equally spaced radial partition walls 4 joined at the center of the kiln. The partitions are made of refractory material only, so that it is unnecessary to waste any cooling space on ducts for cooling metal partition members. The partition walls are built up of refractory bricks and blocks, some of which may be interlocked with tongues and grooves, and of castable refractory material in the smaller irregular spaces. The inner end of each partition wall flares out and joins the partitions at its opposite sides. The outer end of each partition diverges into parallel grooves 5 extending lengthwise of the kiln lining. These grooves are formed by using bricks 6 and 7 of special shape in that area. Due to this interlocking of the partition walls with the kiln lining, the heat exchanger is held securely in position and cannot shift relative to the lining. Also, the lining itself forms the curved outer wall of each heat exchanger tunnel.

Due to the flaring outer ends of the radial partitions, the opposite sides of their outer portions are concave so that the inner surface of each tunnel is gently curved transversely throughout its area. This avoids sharp corners where the partitions meet the kiln lining and the disadvantages arising from them. Because there are only three tunnels, each partition wall opposes a tunnel rather than another partition wall. Consequently, the partition walls do not prevent the kiln from flexing and flattening slightly as it rotates, and the bricks in the walls are not crushed.

Figure 4:
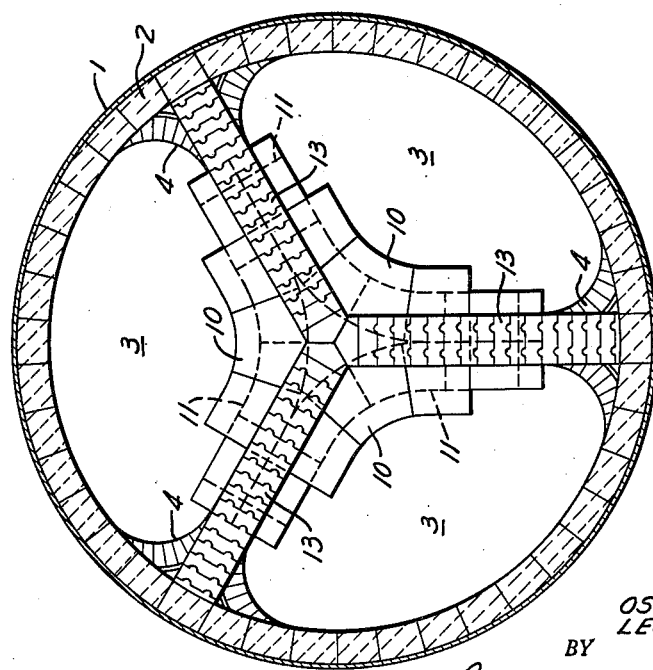
Figure 6:
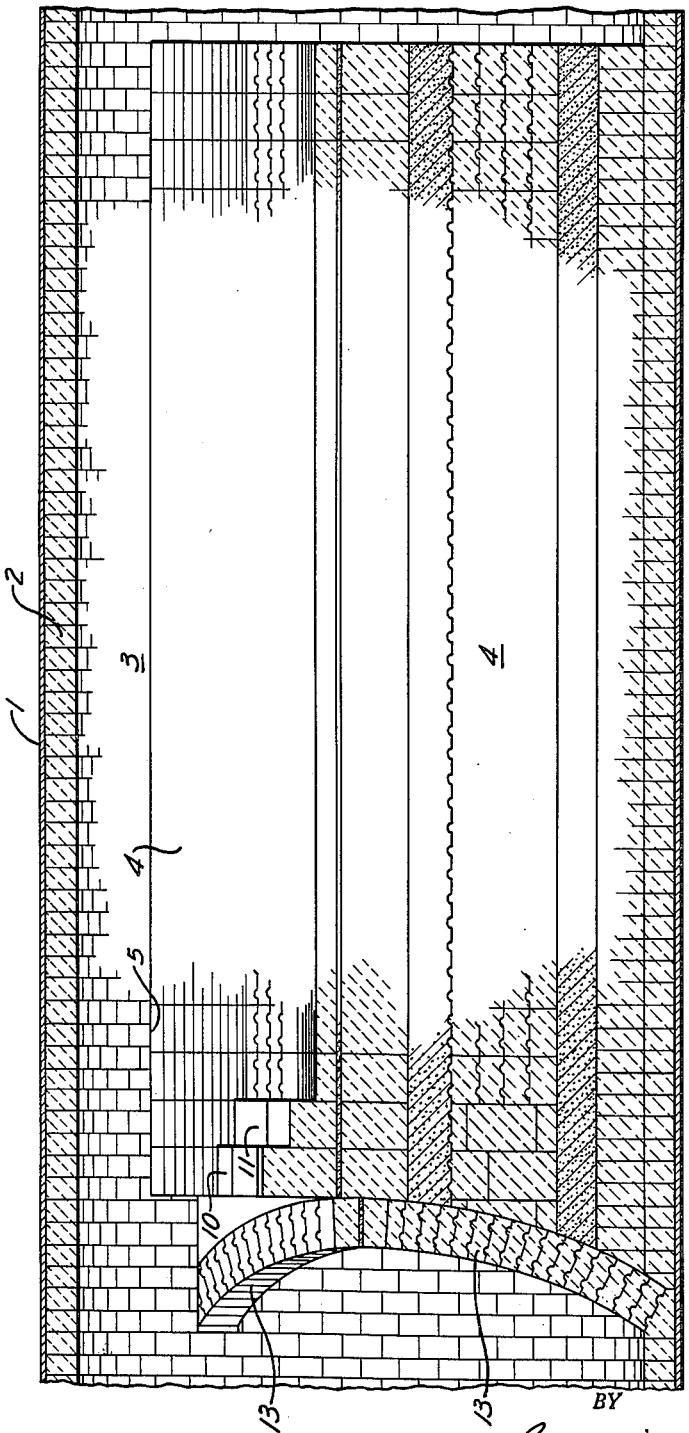
FIG. 6 is a longitudinal section of the heat exchanger taken on the line VI—VI of FIG. 2.

Another feature of this invention is that at the discharge end of each tunnel there is a dam, which is so positioned that it will be at the bottom of the tunnel when that particular tunnel is at the top of its circular path of rotation, as shown in FIGS. 3 and 4. The dam is formed from refractory blocks set into the partition walls and projecting out into the tunnel for several inches. It is preferred that the dam be formed in two courses as shown in FIGS. 5 and 6, the outer or lower course 10 having a higher central portion than the other one 11. The dam extends across the inner wall of the tunnel between the flaring outer ends of the partitions. While a tunnel is rotating through approximately the upper half of its circular path, the dam will prevent the material in the tunnel from discharging from its lower end and falling down across one or both of the other tunnels, where fine material would be likely to be picked up by the draft through the kiln and carried out of the upper end of the kiln. In other words, the material is discharged from any given tunnel only while the tunnel is traveling in the lower half of its path, whereby the material will not fall free across a stream of hot gases.

Trouble has been experienced with an inclined heat exchanger of this general type, due to the courses of bricks at the discharge end of the partition walls separating or peeling away from the remaining courses. To eliminate this trouble, refractory buttresses 13 are provided. As shown in FIGS. 4 and 6, they extend from the junction of the partition walls outwardly along them to the kiln lining, with which their outer ends interlock. They also are inclined from the axis of the kiln toward the discharge end of the kiln, as shown in FIGS. 5 and 6.

A kiln constructed in accordance with this invention is stronger and more durable than those known heretofore, and has a larger capacity. It can be operated at temperatures that are too high for kilns containing metal in their heat exchangers, without sacrificing space to cooling ducts.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A rotary kiln comprising an inclined rotatable cylindrical metal shell having an upper feeding end and a lower discharge end, a refractory lining in the shell, a portion of the kiln being provided with three uniformly spaced radial partition walls meeting at the center of the kiln and extending lengthwise of it, said walls being made of refractory material only and shaped to form with said lining a cluster of three heat exchanger tunnels ovate in cross section, and the opposite sides of the outer portion of each partition wall being concave, and a dam extending across the inner wall of each tunnel between said concave sides at the discharge end of the tunnel, the center of each dam extending radially outward no farther than a straight line connecting the ends of the dam.

2. A rotary kiln comprising an inclined rotatable cylindrical metal shell having an upper feeding end and a lower discharge end, a refractory lining in the shell, a portion of the kiln being provided with three uniformly spaced radial partition walls meeting at the center of the kiln and extending lengthwise of it, said walls being made of refractory material only and shaped to form with said lining a cluster of three heat exchanger tunnels ovate in cross section, the opposite sides of the outer portion of each partition wall being concave, and a dam extending across the inner wall of each tunnel between said concave sides at the discharge end of the tunnel, the center of each dam extending radially outward no farther than a straight line connecting the ends of the dam, each dam being concave and substantially as long as the space between said concave sides of a tunnel.

References Cited in the file of this patent

UNITED STATES PATENTS

| 821,355 | Gerlach | May 22, 1906 |
|---|---|---|
| 2,653,393 | Bojner | Sept. 29, 1953 |
| 2,889,143 | Reaney et al. | June 2, 1959 |

FOREIGN PATENTS

| 451,468 | Germany | Oct. 27, 1927 |